United States Patent [19]
Marshall et al.

[11] 3,926,043
[45] Dec. 16, 1975

[54] ROAD SIMULATOR SYSTEM WITH PROVISION FOR ENGINE DEGRADATION COMPENSATION

[75] Inventors: Richard A. Marshall; Edward F. Miller, both of Indianapolis, Ind.

[73] Assignee: Laboratory Equipment Corporation, Mooresville, Ind.

[22] Filed: Apr. 24, 1974

[21] Appl. No.: 463,470

[52] U.S. Cl. ................................................. 73/117
[51] Int. Cl.² ........................................... G01L 5/13
[58] Field of Search ................... 73/117, 116, 134

[56] References Cited
UNITED STATES PATENTS

| | | | |
|---|---|---|---|
| 3,099,154 | 7/1963 | Vanderbilt, Jr. | 73/116 |
| 3,333,463 | 8/1967 | Hollinghurst | 73/117 |
| 3,364,736 | 1/1968 | Bathurst et al. | 73/134 |
| 3,516,287 | 6/1970 | Masada et al. | 73/117 |

Primary Examiner—Jerry W. Myracle
Attorney, Agent, or Firm—Mason, Kolehmainen, Rathburn & Wyss

[57] ABSTRACT

Method and apparatus for simulating an extended road test on a vehicle, during which test the vehicle may degrade, wherein the vehicle is driven over a predetermined road course while the speed and throttle position thereof is recorded. The vehicle is subsequently operated on a dynamometer in a first simulated road test while the previously recorded throttle position and speed is maintained and the torque provided by the vehicle is measured and recorded. The simulated road test test is then repeated and the throttle position of the vehicle is readjusted to maintain the torque provided by the vehicle substantially similar to that recorded during the first simulated road test. Means are provided to readjust the speed of the vehicle to a value consistent with the torque provided thereby whenever the throttle position is adjusted to the limits of its travel. A frequency controlled feedback system is provided to maintain accurate speed control of the dynamometer.

27 Claims, 4 Drawing Figures

ROAD SIMULATOR SYSTEM WITH PROVISION FOR ENGINE DEGRADATION COMPENSATION

BACKGROUND

This invention relates generally to dynamometer vehicle testing systems, and more particularly to programmable road simulation dynamometer testing systems for testing vehicles over extended periods of time during which time the performance of the vehicle may degrade.

Several dynamometer testing systems are known, ranging from simple dynamometer systems wherein the power output of a vehicle is measured at a predetermined fixed speed and throttle position to fully programmable systems wherein the vehicle throttle position and the corresponding speed may be preprogrammed and dynamically varied to simulate normally encountered road conditions. Examples of the latter type systems are shown in U.S. Pat. Nos. 3,050,994 issued Aug. 28, 1962 to J. J. Heigl et al. and 3,099,154 issued July 30, 1963 to V. C. Vanderbilt, Jr.

Whereas these techniques provide a way to evaluate the performance of a vehicle, the prior art systems have been designed for relatively short tests, and no provisions have been made therein to compensate for the normal degradation in the performance of the vehicle during extended tests such as the 50,000 mile test of pollution controls currently required by the federal government.

In programmable systems according to the prior art, the speed and throttle position of an automobile are recorded during an actual road test to provide a road test record. The road test record is played back on the dynamometer and the throttle position of the vehicle to be tested is adjusted in accordance with the road test record. Simultaneously, the retarding force provided by the dynamometer is adjusted to maintain the speed recorded on the road test record.

Such a system is satisfactory for relatively short dynamometer tests wherein the performance of the vehicle remains substantially constant. However, for extended dynamometer tests during which the power output of the vehicle degrades, the prior art systems maintain the speed of the vehicle at the value indicated by the initial road test record, regardless of the actual power output of the vehicle. In such cases, as the torque provided by the vehicle degrades, the retarding force provided by the dynamometer is correspondingly decreased to maintain the speed constant, thereby providing unrealistic test conditions. In extreme cases of vehicle degradation, wherein the torque provided by the vehicle has degraded to a level substantially below the original torque, the dynamometer may actually drive the vehicle to maintain the speed at the original value, a condition which may result in transmission or other damage to the vehicle.

Other dynamometer road simulation systems have attempted to record speed and torque rather than throttle position, however, due to the time delay between the opening of the throttle and the actual generation of torque, such systems have generally been unstable and responsive only to slowly varying dynamic conditions.

Other problems occurring in prior art systems have resulted from the analog speed control systems generally used in dynamometers wherein a DC voltage indicative of the speed of the vehicle is recorded, amplified and used in a feed-back loop to control the speed of the dynamometer. Such an analog system requires relatively high power linear amplifiers which are expensive and are subject to degradation and failure.

SUMMARY

Accordingly, it is an object of the present invention to provide an improved dynamometer road simulation system having means for compensating for the gradual degradation of a vehicle that may occur during extended tests.

Another object of the present invention is to provide a road simulation system that readjusts the position of the throttle as the vehicle degrades to maintain the output torque initially provided.

Yet another object of this invention is to provide more accurate control of the vehicle by providing a programmable dynamic testing system wherein three parameters of the vehicle are recorded and used to control the dynamometer.

Still another object of the present invention is to provide a road simulation system that adjusts the speed and acceleration of the vehicle as the vehicle degrades to levels commensurate with the degraded performance of the vehicle.

A still further object of the invention is to provide a dynamometer testing system having an improved digital speed control system.

In accordance with the preferred embodiment of the invention, a road test record is obtained from a vehicle similar to the type of vehicle to be tested by means of an actual road test. The actual road test is conducted by driving the vehicle over a predetermined road course and by recording the speed and corresponding throttle position of the vehicle during the road test. Preferably, the throttle position is recorded by monitoring the voltage developed across a potentiometer coupled to the accelerator pedal of the vehicle, and the speed is measured by mounting a fifth wheel having a tachometer connected thereto on the vehicle. The output from the tachometer is preferably an alternating current voltage having a frequency proportional to the speed of the vehicle.

A first simulated road test utilizing a programmable dynamometer is then performed on the vehicle or on a similar vehicle. During the first simulated road test the throttle position of the vehicle is adjusted in accordance with the road test record, and the speed of the vehicle is adjusted by adjusting the retarding force provided by the dynamometer so that the vehicle speed is similar to that recorded on the road test record for each recorded throttle position. The retarding force (or accelerating force in the case of a down-hill simulation) provided by the dynamometer is monitored and recorded on a third channel. Alternately, the torque provided by the vehicle may be monitored by means of a torque wheel or other device and recorded on the third channel.

Subsequent road tests are then performed and the vehicle torque or retarding (or accelerating) force of the dynamometer is monitored and compared with the torque or retarding force recorded on the third channel. Should the torque or retarding force vary, as a result of vehicle degradation or other causes, the throttle position of the vehicle is automatically adjusted by means of feed-back circuitry to maintain the power output of the vehicle at substantially the original value. Should the vehicle be so badly degraded that a full throttle position does not provide the required power output, means are provided for automatically adjusting the speed of the vehicle to a value commensurate with the degraded power output.

Digital control means are provided to accurately control the speed of the dynamometer, and several safety features, including a time-out feature which terminates the test in the event that the retarding force or torque deviates from the recorded third channel signal by a predetermined amount for a predetermined time period, are provided.

DETAILED DESCRIPTION

Figure 1:
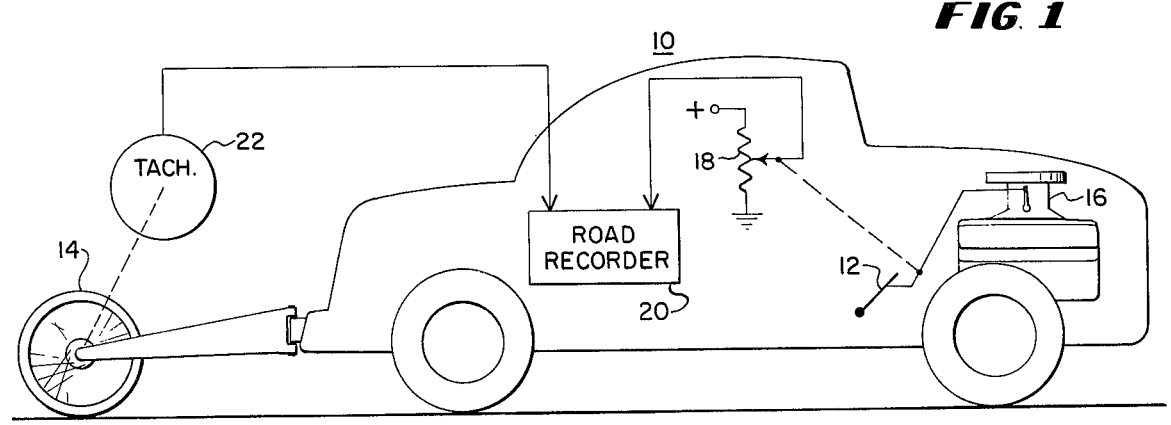
FIG. 1 is a diagram showing the apparatus used to produce the road test record mounted on the test vehicle.

Referring to FIG. 1, there is shown a vehicle 10 having an accelerator pedal 12 and associated linkage, and a fifth wheel 14 attached thereto. The accelerator 12 is mechanically coupled to a carburetor 16 and controls the amount of power provided by the engine. Alternately, the accelerator 12 may be connected to a fuel injection system, or to electric control circuitry in the case of an electrically driven vehicle. The accelerator pedal 12 is also mechanically coupled to a position indicating device, in this embodiment a potentiometer 18. The resistance element of the potentiometer 18 is connected between a source of electric potential and ground, and the wiper arm thereof is mechanically coupled to the accelerator pedal 12 to be moved thereby, and electrically coupled to a road recorder 20. The fifth wheel 14 is mechanically coupled to a tachometer 22, which provides an alternating current signal to the road recorder 20. The tachometer 22 may be an alternating current generator, a square wave generator or any device that provides an alternating current signal having a frequency proportional to the speed of the wheel 14. The road recorder 20 must be capable of simultaneously recording at least two channels, one channel receiving the speed indicative signal from the tachometer 22 and the other channel receiving the throttle position indicative signal from the potentiometer 18.

In order to generate the road record, the vehicle 10 is road tested over a predetermined road course while the speed thereof, as indicated by the tachometer 22, and the throttle position, as indicated by the potentiometer 18, are simultaneously recorded to provide a record of the throttle position and the speed resulting from the throttle position during the road test. The torque provided by the vehicle 10 is not monitored nor recorded at this time, but a third torque indicative signal is added to the road record during the first simulated road test on the dynamometer system. The procedure for recording the torque indicative signal will be described in a subsequent portion of the specification.

Figure 2:
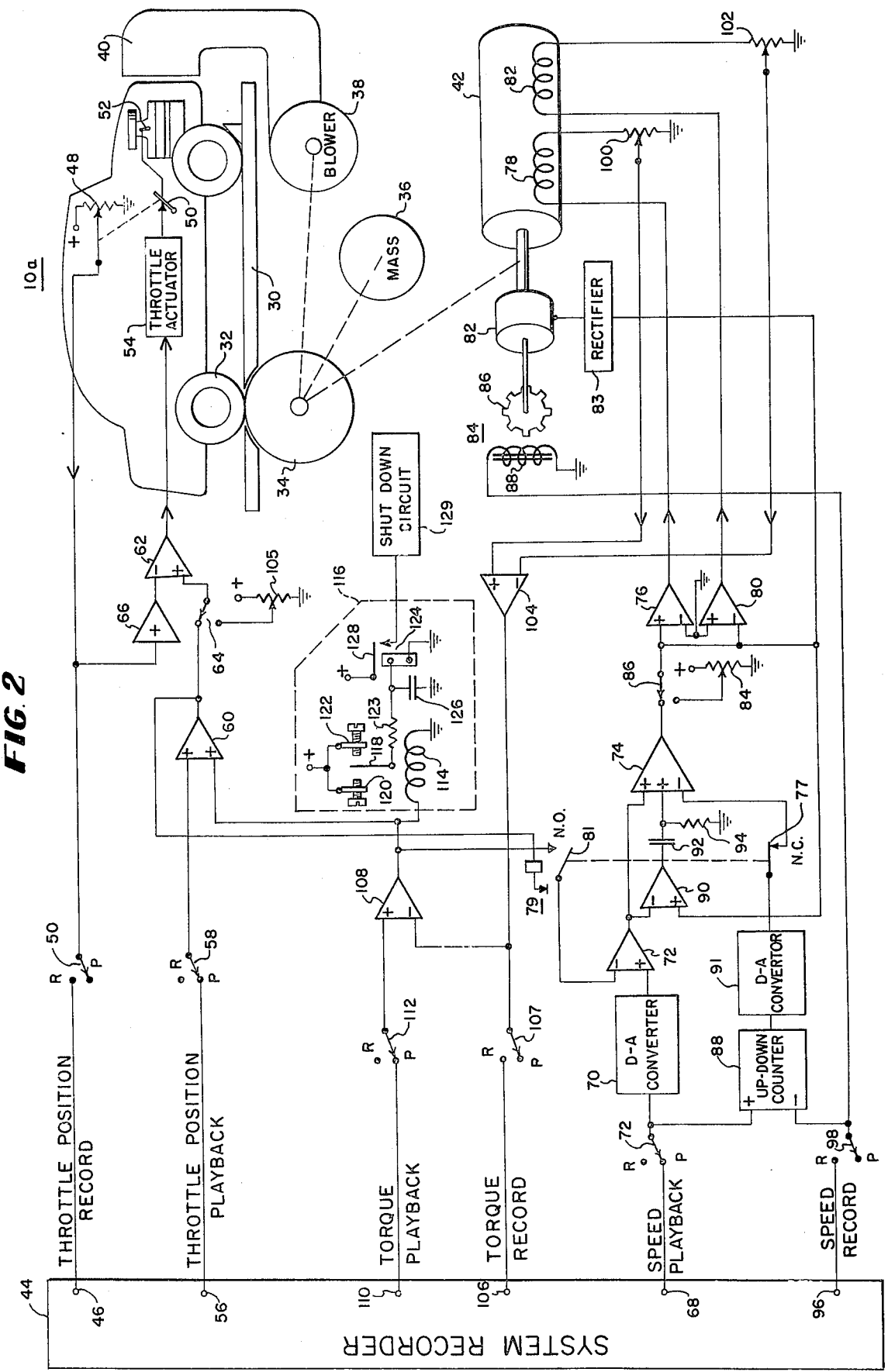
FIG. 2 is a block diagram showing the dynamometer control system according to the invention, and shows a test vehicle mounted on the dynamometer platform.

Referring to FIG. 2, there is shown a vehicle 10a, which may be the same vehicle as the vehicle 10 of FIG. 1, or a similar vehicle, mounted on a dynamometer platform 30. The driving wheels 32 of the vehicle 10a are brought into contact with a dynamometer traction roller 34 which drives a mass 36 and operates a blower 38. The weight of the mass 36 is selected to provide an inertial load to the roller 34 similar to the inertial load of the vehicle 10a. The blower 38 provides a load to the vehicle 10a and hence the roller 34 similar to the wind resistance encountered by the vehicle 10a. The airstream from the blower 38 is ducted to the radiator of the vehicle 10a by means of a duct 40 to provide cooling for the engine of the vehicle. The roller 34 is also mechanically coupled to a combined accelerating retarding device 42 which is used to provide transient loads to the traction roller 34. In a typical embodiment, the device 42 may contain an eddy current inductor which acts as an absorber to provide a retarding force on the roller 34 and an electric motor which provides a motoring force to simulate a down-hill grade. Alternately, a separate motor and absorber may be used. The components described in the foregoing are conventional road simulation dynamometer parts, well-known in the art, and variations thereof may be used in conjunction with the control system described below and still fall within the scope and spirit of the invention.

The control system for the road simulation system includes a system recorder 44 which may be a magnetic tape or similar recorder capable of recording and playing back at least three channels of information. The recording input terminal for a first channel, namely the throttle position record input point 46 is connected to the wiper arm of a throttle position indicating device, in this embodiment a potentiometer 48 by means of a record-playback switch 50. The potentiometer 48 is mechanically coupled to an accelerator pedal 50 which is further mechanically coupled to the carburetor 52 of the vehicle and a throttle actuator 54 which includes a drive mechanism having a travel compatible with the travel of the accelerator pedal 50. An accelerator pedal 50 is shown connected to a carburetor 52, but any type of accelerator means may be used to control the power output of the vehicle.

The throttle position control channel includes a throttle position playback output 56 of the system recorder 44 coupled to the throttle actuator 54 by means of a record-playback switch 58, a pair of amplifiers 60, 62 and a manual-automatic switch 64. An amplifier 66 is connected between the output of the potentiometer 48 and an input of the amplifier 62 to provide a feedback signal for the throttle position circuit.

The speed control channel includes a speed signal playback output 68 which is connected to a digital to analog converter 70 by means of a record-playback switch 72. The output of the converter 70 is connected to a series of amplifiers 72, 74 and 76, the last of which drives a clutch coil 78 of the device 42. The clutch coil 78 may be part of an electrically controlled clutch, which operates in conjunction with the electric motor of device 42 to provide a variable motoring force to the traction roller 34. In a typical embodiment, the electric motor is a constant speed motor and the amount of motoring provided is varied by varying the current through the coil 78 to vary the amount of coupling provided by the clutch between the motor and the roller 34. The amplifier 74 is also coupled to an amplifier 80 which drives an eddy current absorber winding 82 of the device 42. The amplifiers 76 and 80 may be manually controlled by means of a manual control shown schematically as potentiometer 84. The switch 86 is used to switch the amplifiers 76 and 80 to either the amplifier 74 to provide automatic control, or the potentiometer 84 to provide manual control.

A speed control feedback loop comprises an up-down counter having an up counting input connected to the speed control playback output 68 and an output connected to a digital to analog converter 91. The output of the digital to analog converter 91 is connected to an inverting input of the amplifier 74 by means of a normally closed pair of contacts 77 of the relay 79 which also has a normally open contact pair 81.

An alternating current tachometer 84 has a rotor mechanically coupled to the roller 34 and a rectifier 83 connected thereto. The rectifier 83 provides an output signal having a voltage proportional to the speed of the roller 34 to the input of an amplifier 90 and to opposite polarity inputs of the amplifiers 76 and 80. The amplifier 90 has a second input connected to the output of the amplifier 72 and an output connected to an input of the amplifier 74 by means of a series capacitor 92 and a shunt resistor 94. A second tachometer 84, which has a rotor wheel 86 and a pickup coil 88, is also mechanically coupled to the roller 34, and provides a square wave signal having a frequency proportional to the speed of the roller 34 to the down counting input of the up-down counter 88. The output of the tachometer 84 may also be coupled to a speed recording input 96 of the system recorder 44 by means of a switch 98 if a record of the speed of the dynamometer is desired.

The torque channel comprises a pair of sensing potentiometers 100 and 102 connected in series with the clutch and absorber coils 78 and 82, respectively. The wiper arms of the potentiometers 100 and 102 are connected to inverting and non-inverting inputs, respectively, of an amplifier 104 which has an output connected to the torque recording input 106 of the system recorder 44 by means of a record-playback switch 107. The output of the amplifier 104 is also connected to an inverting input of an amplifier 108 which has a second non-inverting input connected to a torque playback output 110 of the system recorder 44 by means of a record-playback switch 112. The output of the amplifier 108 is connected to a non-inverting input of the amplifier 60 and to a coil 114 of a time-out timer circuit 116 which has a movable contact 118 and a pair of stationary contacts 120 and 122. A relay 124 and a capacitor 126 are connected to the movable contact 118 through a resistor 123, the relay 124 being responsive to the voltage across the capacitor 126 to activate the armature 128 when the voltage across the capacitor 126 reaches a predetermined level. Activation of the armature 128 causes the shut-down circuit 129 to render the system inoperative to prevent damage to the system or the vehicle.

The coil of the relay 79 is connected to the output of the amplifier 60 and is responsive to the signal thereat to activate the contacts 77 and 81 when the output signal from the amplifier 60 reaches a predetermined signal level indicating that the throttle actuator 64 has reached one of the limits of its travel.

In operation, the road record containing the throttle position record and the speed record obtained during the road test by the apparatus of FIG. 1 is placed on the system recorder 44. If compatible recording media are used, the record from the road recorder 20 may be played back by the system recorder 44, or alternately, the road record from the recorder 20 may be rerecorded on a separate recording medium by the system recorder 44.

The vehicle 10a is placed on the dynamometer such that the driving wheels 32 are in contact with the dynamometer traction roller 34. The engine of the vehicle 10a is started, and the road record is played back by the system recorder 44. The throttle position signal from the output point 56 of the system recorder 44 is a direct current signal which is amplified by the amplifiers 60 and 62 and applied to the throttle actuator 54 to cause the actuator 54 to move the accelerator 50 in response to a voltage received from the amplifier 62. The wiper arm of the potentiometer 48 is mechanically coupled to the accelerator 50 and moves in conjunction therewith to provide an output voltage proportional to the mechanical position of the accelerator 50 to the amplifier 66. The voltage from the potentiometer 48 is amplified by the amplifier 66 and applied to the inverting input of the amplifier 62 to cancel the effect of the voltage of the amplifier 60 which is applied to the non-inverting input. The potentiometer 48 and the amplifier 66 serve as a negative feed-back loop for the throttle actuator 54 to stop the movement of the actuator 54 when the voltages at the inverting and non-inverting inputs of the amplifier 62 are equal. Hence, the throttle actuator 54 will move the accelerator 50 and the potentiometer 48 to tend to equalize the voltages at the input of the amplifier 62, thereby causing the movement of the accelerator 50 to follow the direct current signal from the output point 56 of the system recorder 44.

As the accelerator 50 is moved in response to the signal recorded on the record medium, the simulated speed of the vehicle is simultaneously adjusted by adjusting the amount of retardation (absorber) or motoring (clutch) provided by the device 42. The amount of motoring or absorption provided is determined by the amount of current applied to the clutch and absorption coils 78 and 82, respectively.

In order to control the amount of motoring and absorption provided, the alternating current signal from the output point 68 of the system recorder 44 is applied to the digital to analog converter 70 which provides a direct current voltage proportional to the frequency of the signal applied thereto. The DC voltage from the converter 70 is applied to opposite polarity inputs of the amplifiers 76 and 80 by means of the amplifiers 72 and 74. The polarities of the amplifiers 76 and 80 are chosen such that when the output of the amplifier 74 increases, indicative of the condition that the frequency of the signal from the recorder 44 is higher than the frequency from the tachometer 84, the amplifier 76 applies current to the clutch coil 78 proportional to the amplitude of the signal from amplifier 74 to increase the simulated speed of the vehicle. When the amplitude of the signal from the amplifier 74 is reduced, indicative of excessive vehicle speed, the amplifier 76 is cut off and the amplifier 80 applies a current to the absorber coil 82 proportional to the amplitude of the signal from the amplifier 74 to reduce the speed of the vehicle until the frequency of the signal from the tachometer 84 is substantially equal to the frequency of the speed control signal from the recorder 44. Thus, the dynamometer controls the speed of the vehicle for a given throttle adjustment much as the terrain encountered in the initial road test affected the vehicle speed. The excitation of the clutch winding 78 causes the device 42 to aid the rotation of the traction roller 34 to simulate a down-hill condition, whereas excitation of the absorber winding 82 causes a retarding force to be applied to the roller 34 to simulate an up-hill condition or a drag force.

In order to accurately control the speed of the roller 34, pulses from the tachometer 84 are compared with pulses from the system recorder 44. The square wave output signal from the tachometer 84 is applied to the down counting input of the up-down counter 88, and pulses from the output 68 of the system recorder 44 are applied to the up counting input of the counter 88. The counter 88 stores the count and applies the count stored therein to the converter 91. The output signal from the converter 91, which is applied to the amplifier 74, and has a polarity selected for causing an increase in the amount of current applied to the clutch coil 78 if the count stored in the counter 88 is positive, and an increase in the amount of current applied to the absorber coil 82 if the count in the counter 88 is negative. Thus, the tachometer 84 and the counter 88 serve as a negative feed-back loop for the system wherein a pulse from the output point 68 causes an up count in the counter 88 and a pulse from the tachometer 84 causes a down count in the counter 88. In normal operation, when the dynamometer speed is synchronized to the speed indicated by the system recorder, the tachometer 84 provides a pulse to the counter 88 for each pulse provided by the output point 68, thereby tending to maintain the count stored in the counter 88 at zero. Any deviation from a zero count is sensed by the converter 91 and an appropriate amount of motoring or absorption is provided to return the count to zero, thereby maintaining the system digitally synchronized to provide extremely accurate control of the simulated speed of the vehicle, limited only by the accuracy of the tachometers. Should a permanent record of the speed variation be desired, such as in cases wherein the system is controlled manually by the potentiometer 105, the switch 98 may be operated to the record position, designated as R, to record the output of the tachometer 84.

The function of the tachometer 82 is to provide a coarse speed control feed-back signal for the dynamometer. The tachometer 82 is an analog tachometer that provides a voltage at the output of the rectifier 83 proportional to the speed of the roller 34 to the amplifiers 76 and 80, and forms part of an analog feed-back circuit for maintaining the dynamometer at approximately the proper speed independently of the digital control circuitry previously described. Once the system is operating at approximately the proper speed, the digital control circuitry provides a fine adjustment to maintain the dynamometer system in synchronism with the recorded digital signal. To assure system stability, the analog tachometer 82 is also connected to the amplifier 90 in the digital speed control loop, and operates as a damping circuit to limit the rate at which the speed of the system can be changed, thereby eliminating undesirable oscillations and transients.

The road record obtained from the actual road test contains only throttle position information and speed information. In order to provide the necessary torque information required to practice the invention, a first simulated road test is conducted wherein the amount of current applied to the clutch coil 78 and the absorber coil 82 required to maintain the programmed speed is recorded.

The recording is accomplished by operating the switch 107 to its record, R, position to couple the amplifier 104 to the recorder 44. The current flowing through the coils 78 and 82, which is proportional to the amount of torque provided by the vehicle during the first road test, also flows through the respective potentiometers 100 and 102 connected in series therewith, thereby resulting in a voltage proportional to the respective current being applied to the amplifier 104. Since the potentiometers 100 and 102 are connected to opposite polarity inputs of the amplifier 104, a voltage having a first polarity will be recorded when the motoring coil is energized and a voltage having the opposite polarity will be recorded when the absorber coil is energized.

After the torque record has been recorded, the simulated road test may be repeated any number of times, using the recorded torque record of the first simulated run, and the system will automatically compensate the throttle position to maintain the torque constant as the engine degrades. To provide engine degradation compensation, the recorded torque signal is applied to the amplifier 108 from the output point 110. Simultaneously the signal from the clutch and absorber coils 78 and 82 is applied to the other input of the amplifier 108 by means of the amplifier 104. As long as the signals applied to the amplifier 108 are substantially equal, no correction signal is applied to the amplifier 60 in the throttle control circuit.

As the performance of the vehicle 10a degrades, the speed control circuitry adjusts the current applied to the clutch and absorber coils to tend to maintain the speed of the vehicle constant. The change in the current flowing through the coils 78 and 82 is monitored, and the throttle is adjusted to tend to maintain the torque output of the vehicle substantially constant, as follows. The change in the current flowing through the coils 78 and 82 is sensed by the amplifier 104, and results in unequal voltages being applied to the amplifier 108. The inequality of voltages applied to amplifier 108 causes an output signal to be provided to the amplifier 60 to cause the throttle actuator to change the position of the throttle 50 to maintain the torque as originally recorded. For example, as the torque of the engine decreases, in order to maintain the speed constant, the speed control circuitry will tend to reduce the current flowing through the absorber coil 82, thereby reducing the voltage applied to the negative input terminal of the amplifier 104. The reduced voltage at the output of the amplifier 104 will cause a torque error signal to appear at the output of the amplifier 108. The torque error signal will be applied to the amplifier 60 in the throttle position control circuit and cause the throttle actuator to further actuate the throttle until the amount of current passing through the absorber coil is substantially similar to the amount of current that was recorded during the initial simulated test.

The recorded torque error signal is also useful for sensing abnormal conditions such as, for example, a failure of the drive train or engine of the vehicle 10a. A shut-off feature is provided by the time out timer 116, which comprises a meter movement having a coil 114 and adjustable contacts 120 and 122. For example, should the vehicle 10a run out of fuel or otherwise fail, a large torque error signal will be present at the output of the amplifier 108, thereby resulting in full deflection of the movement 118. As the movement 118 is brought into contact with one of the fixed contacts 120 and 122, the capacitor 126 is charged from the source of positive potential until a predetermined potential causing the relay 124 to be energized has been reached. The relay 124 may be connected to a shutdown circuit 129 and used to shut down the dynamometer system or to sound an alarm. The shut-down circuit may be a sequencing circuit that shuts down the engine of the vehicle, removes the power from the dynamometer motor and applies full absorber power to bring the system to a stop. By making the contacts 120 and 122 adjustable, the amount of torque error that can be tolerated before the system is shut down may be adjusted, and an adjustment of the value of the capacitor 126 and the resistor 123 adjusts the length of time that the excessive error will be tolerated.

As the vehicle degrades, the accelerator 50 will be gradually depressed toward one of the limits of its travel as the torque compensating circuit attempts to maintain the torque of the vehicle constant. If the vehicle degrades sufficiently such that fully depressing the accelerator 50 does not provide the torque called for the torque recording channel, the system according to the invention automatically compensates for the reduced torque by adjusting the current supplied to the clutch coil 78 or absorber coil 82 to adjust the speed of the vehicle to a value consistent with the maximum torque that the vehicle can provide.

The position of the throttle is sensed by the relay 79, the coil of which is connected to the output of the amplifier 60. When the output of the amplifier 60 reaches a magnitude indicative of the condition that the accelerator 50 has been fully depressed, the relay 79 is energized to close the contact 81 and open the contact 77. Opening the contact 77 disables the digital tachometer speed control circuit and places the speed control circuit under the control of the amplifier 108 in the torque channel. The output of the torque error amplifier 108 is connected to an input of the amplifier 72 in the speed control circuit and causes the amount of excitation current to be applied to the coils 78 and 82 to adjust the absorbing (or motoring) provided by the dynamometer to a level consistent with the torque provided by the vehicle. The adjustment of the motoring or absorbing results in a change in the speed and acceleration of the vehicle similar to the change that would be encountered when driving a degraded vehicle on the road. Hence, the dynamometer no longer attempts to make the vehicle operate at the programmed speed when the power provided by the vehicle would be inadequate to maintain the programmed speed on the road, but rather, adjusts the simulated speed to the speed that could actually be obtained by the vehicle under the initial road conditions.

In the embodiment described in the foregoing, the torque provided by the vehicle was measured by measuring the amount of excitation current provided to the clutch (motoring) or absorber coil of the dynamometer. In an alternate embodiment, the torque provided by the vehicle may be measured directly by placing a torque wheel on one of the driving shafts of the vehicle. Such torque wheels are well-known in the art and generally contain strain gauges or the like which have an impedance that varies as a function of the amount of torque applied to the torque wheel.

Figure 3:
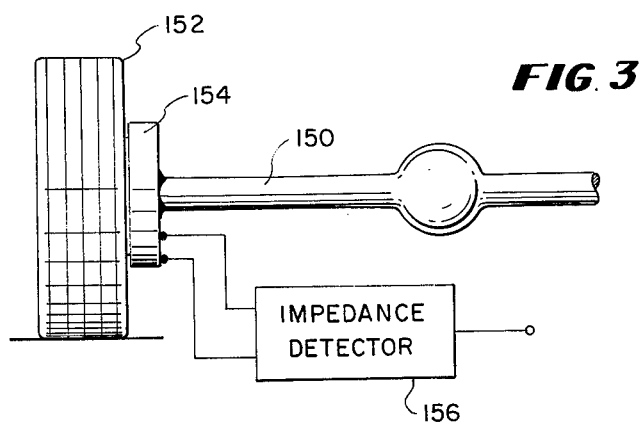
FIG. 3 is a fragmentary view of a driving axle of the test vehicle showing a torque measuring wheel mounted thereon.

Referring to FIG. 3, there is shown a partial drawing of a rear axle of a vehicle showing an axle portion 150 and a wheel 152 attached to the rear axle. A torque wheel 154 is interposed between the driving axle and the wheel 152 and is used to measure the amount of torque applied to the wheel 152. An impedance detector 156, such as a standard bridge circuit, is electrically connected to the torque wheel 154 and provides an output voltage indicative of the impedance of the torque wheel 154. The output of the impedance detector 156 may be connected, for example, to the torque input of the amplifier 108 and to the torque input 106 of the system recorder 44 to provide a torque signal for the system.

Figure 4:
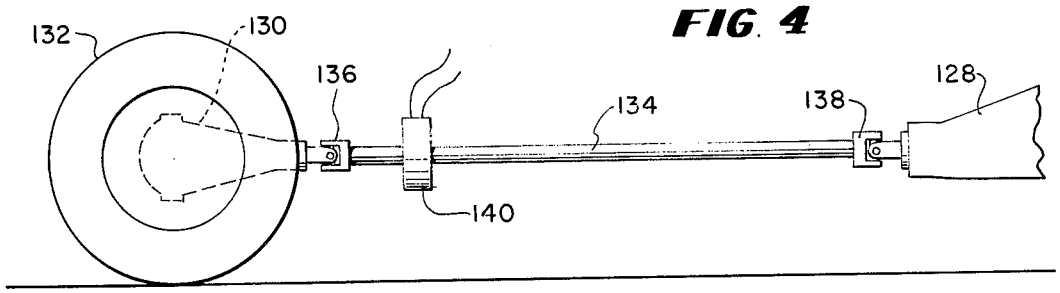
FIG. 4 is a fragmentary view of the drive train of a vehicle showing the drive shaft and a torque measuring wheel mounted on the drive shaft.

Alternately, the torque wheel may be placed in the drive shaft of the vehicle as shown in FIG. 4. In FIG. 4, there is shown a portion of a transmission housing 128, a rear axle 130, a wheel 132 driven by the axle 130, and a drive shaft 134 connected between the area axle 130 and the transmission 128 by means of universal joints 136 and 138. The drive shaft 134 contains a torque wheel 140 which is deformed in proportion to the amount of torque being transmitted by the drive shaft 134. As in the case of FIG. 3, the torque wheel 140 may be connected to an impedance detector similar to detector 126 to provide a voltage indicative of torque to the system of FIG. 2.

Although particular embodiments of the system according to the invention have been illustrated in the drawings and specification, it should be noted that modifications apparent to those skilled in the art still fall within the scope and spirit of the invention.

What is claimed and desired to be secured by Letters Patent of the United States is:

1. The method for simulating a road test of an accelerator controlled vehicle comprising the steps of:

road testing the vehicle to provide a road test record having signals representative of the speed of the vehicle and the corresponding position of the accelerator recorded thereon;

placing a driving wheel of the vehicle in contact with a traction roller of a dynamometer;

simulating a road test by playing back the road test record and adjusting the position of the accelerator in accordance with the position indicated by the accelerator position representative signal recorded on the road test record while simultaneously adjusting the mechanical load provided by the dynamometer traction roller to maintain the speed of the vehicle substantially similar to the speed indicated by the speed representative signal recorded on the road test record;

monitoring the torque provided by the vehicle during the road test simulation and recording a signal representative of the torque corresponding to each speed and accelerator position occurring during the road test simulation;

repeating the road test simulation while playing back the record torque representative signal and comparing the torque indicated by the recorded torque representative signal with the torque provided by the vehicle during the repeated road test simulation; and adjusting the accelerator position of the vehicle during the repeated road test simulation as required to maintain the torque provided by the vehicle substantially similar to the torque indicated by the recorded torque representative signal obtained during the road test simulation and to maintain the speed of the vehicle substantially similar to the speed indicated by the road test record.

2. The method recited in claim 1 wherein the step of providing the road test record includes the step of road testing a vehicle over a predetermined route and simultaneously recording signals representative of the speed of the vehicle and the corresponding position of the accelerator during the road test.

3. The method recited in claim 1 wherein said accelerator has a limited range of adjustment further including the step of adjusting the mechanical load of the dynamometer traction roller to the value of the torque provided by the vehicle whenever the position of the accelerator approaches a limit of the range thereof to thereby adjust the speed of the vehicle to a value consistent with the torque provided thereby.

4. The method recited in claim 1 wherein the traction roller has a mechanical load adjusting transducer connected thereto, said mechanical load adjusting transducer being controlled by an electrical control signal, wherein the step of monitoring the torque provided by the vehicle includes the step of monitoring the electrical control signal.

5. The method recited in claim 1 wherein the step of monitoring the torque provided by the vehicle includes the step of mounting a torque sensing transducer on a driving shaft of the vehicle and monitoring the signal provided by the torque sensing transducer.

6. A programmable chassis dynamometer system for conducting simulated road tests on a motor vehicle having accelerator means for adjusting the power output of the vehicle and power transmission means, wherein the vehicle operating speed, position of the vehicle accelerator means, and mechanical load applied to the vehicle by the dynamometer system are adjustable in accordance with a preprogrammed record, said system including in combination;
   programming means for simultaneously providing three control signals representative of the vehicle operating speed, the position of the accelerator means, and the mechanical load to be applied to the vehicle;
   accelerator control means electrically connected to said programming means and mechanically coupled to said vehicle accelerator means, said accelerator control means being responsive to the accelerator position representative control signal for adjusting the position of the accelerator means.
   mechanical loading means mechanically coupled to the power transmission means of the vehicle for placing a mechanical load thereon, said mechanical loading means including variable load means for varying the magnitude of the mechanical load provided by said mechanical loading means;
   speed control means electrically connected to said programming means and said variable load means, said speed control means being responsive to the speed representative control signal for varying the magnitude of the mechanical load provided by the mechanical loading means to maintain the operating speed of the vehicle at a level determined by said speed representative control signal; and
   load monitoring means electrically connected to said programming means and coupled to said accelerator means, said load monitoring means being responsive to the load representative control signal for adjusting the position of the accelerator means to maintain the mechanical load provided by said mechanical loading means at a level determined by said load representative control signal.

7. A system as recited in claim 6 wherein said accelerator means has a limited range of adjustment further including accelerator limit detector means coupled to said accelerator means and to said speed control means for varying the mechanical load provided by said mechanical load means to reduce the operating speed of the vehicle when the accelerator means reaches a limit of the adjustment range.

8. A system as recited in claim 6 wherein said speed control means includes tachometer means for providing a speed sensing signal having a frequency proportional to the vehicle operating speed mechanically coupled to said mechanical loading means, and frequency comparison means for comparing the frequency of signals applied thereto connected to said programming means and said tachometer means.

9. A system as recited in claim 8 wherein said speed control means includes second tachometer means mechanically coupled to said mechanical loading means.

10. A system as recited in claim 8 wherein said comparison means includes an up-down counter.

11. A system as recited in claim 10 wherein said comparison means includes a digital to analog converter.

12. A system as recited in claim 6 wherein said variable loading means is adapted to be energized by energizing current, and said load monitoring means includes means responsive to said energizing current connected to said variable load means.

13. A system as recited in claim 12 wherein energizing current responsive means includes a resistor connected in a series circuit with said variable load means.

14. A system as recited in claim 6 wherein said load monitoring means includes torque responsive means having an electrical parameter that varies in accordance with the amount of torque applied thereto mechanically coupled to said power transmission means.

15. A system as recited in claim 6 further including abnormal condition sensing means connected to said load monitoring means and said programming means, said abnormal condition sensing means being responsive to said load monitoring means and said mechanical load representative control signal for providing a signal indicative of an abnormal condition when the mechanical load provided by the mechanical loading means deviates from the mechanical load represented by the load representative control signal by a predetermined amount for a predetermined time duration.

16. A system as recited in claim 15 wherein said abnormal condition sensing means includes electromechanical switch means and a capacitor.

17. A programmable chassis dynamometer system for conducting simulated road tests on a motor vehicle having accelerator means for adjusting the power output of the vehicle and power transmission means, wherein the vehicle operating speed, position of the vehicle accelerator means, and mechanical load applied to the vehicle by the dynamometer system are adjustable in accordance with a preprogrammed record, said system including in combination:
   programming means for providing a control signal representative of the position of the vehicle accelerator means and a digital control signal having a frequency representative of the operating speed of the vehicle;

accelerator control means electrically connected to said programming means and mechanically coupled to said vehicle accelerator means, said accelerator control means being responsive to the accelerator position representative control signal for adjusting the position of the accelerator means;

mechanical loading means mechanically coupled to the power transmission means of the vehicle for placing a mechanical load thereon, said mechanical loading means including variable load means for varying the magnitude of the mechanical load provided by said mechanical loading means; and digital speed control means electrically coupled to said variable loading means for varying the magnitude of the mechanical load provided by said mechanical loading means to maintain the operating speed of the vehicle at a level determined by said speed representative digital control signal, said digital speed control means including digital tachometer means for providing a signal having a frequency proportional to the operating speed of the vehicle and frequency comparison means coupled to said tachometer means and said programming means for comparing the frequencies of the signals provided by said digital tachometer means and the digital control signal provided by said programming means.

18. A system as recited in claim 17 wherein said programming means includes means for generating a digital control signal comprising a wheel having second digital tachometer means mechanically coupled thereto, means responsive to said vehicle accelerator means for generating said accelerator position control signal and means for recording and playing back said digital control signal and said accelerator position representative control signal.

19. A system as recited in claim 17 wherein said frequency comparison means further include digital to analog conversion means for providing an analog signal having an amplitude proportional to the difference in the frequencies of the signals compared thereby.

20. A system as recited in claim 19 wherein said digital speed control means includes analog tachometer means for providing an analog signal having an amplitude that varies in accordance with the operating speed of the vehicle, and load control means connected to said variable load means, said load control means being responsive to the analog signals provided by said analog tachometer means and said digital to analog conversion means to vary the mechanical load provided by said mechanical loading means.

21. A system as recited in claim 20 wherein said digital speed control means includes an up-down counter.

22. A system as recited in claim 20 wherein said analog tachometer includes an alternating current producing tachometer and rectifier means for rectifying the alternating current produced thereby.

23. A system as recited in claim 20 wherein said load control means includes high pass filter means responsive to said analog tachometer for damping said variable load means.

24. A system as recited in claim 17 wherein said programming means further includes means for providing a third control signal representative of the mechanical load to be applied to the vehicle.

25. A system as recited in claim 24 further including load monitoring means coupled to said accelerator control means and said programming means, said load monitoring means being responsive to said third control signal for adjusting said accelerator means to maintain the mechanical load provided by said loading means at a level determined by said third control signal.

26. A system as recited in claim 25 further including means coupled to said load monitoring means and responsive thereto for rendering said system and said vehicle inoperative when the mechanical load provided by said loading means deviates from the level determined by said third control signal by a predetermined amount for a predetermined time duration.

27. A system as recited in claim 25 further including means responsive to the position of said accelerator means for readjusting the mechanical load provided by said loading means when said accelerator means reaches a predetermined position.

* * * * *